Figure 2:
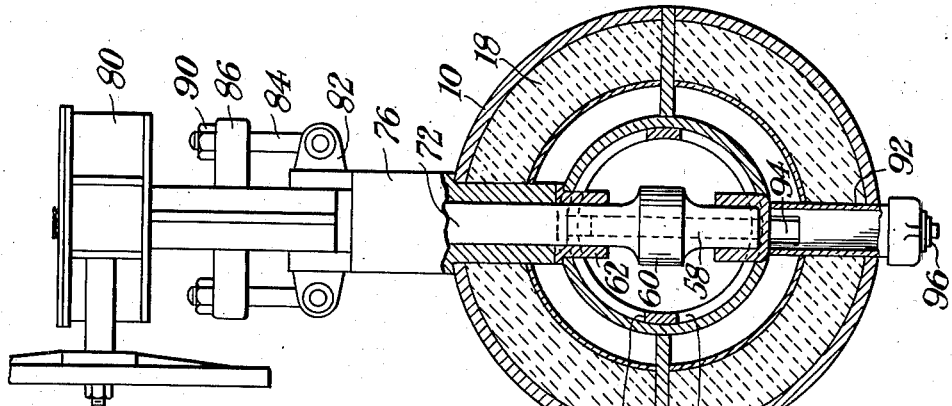
Figure 1:
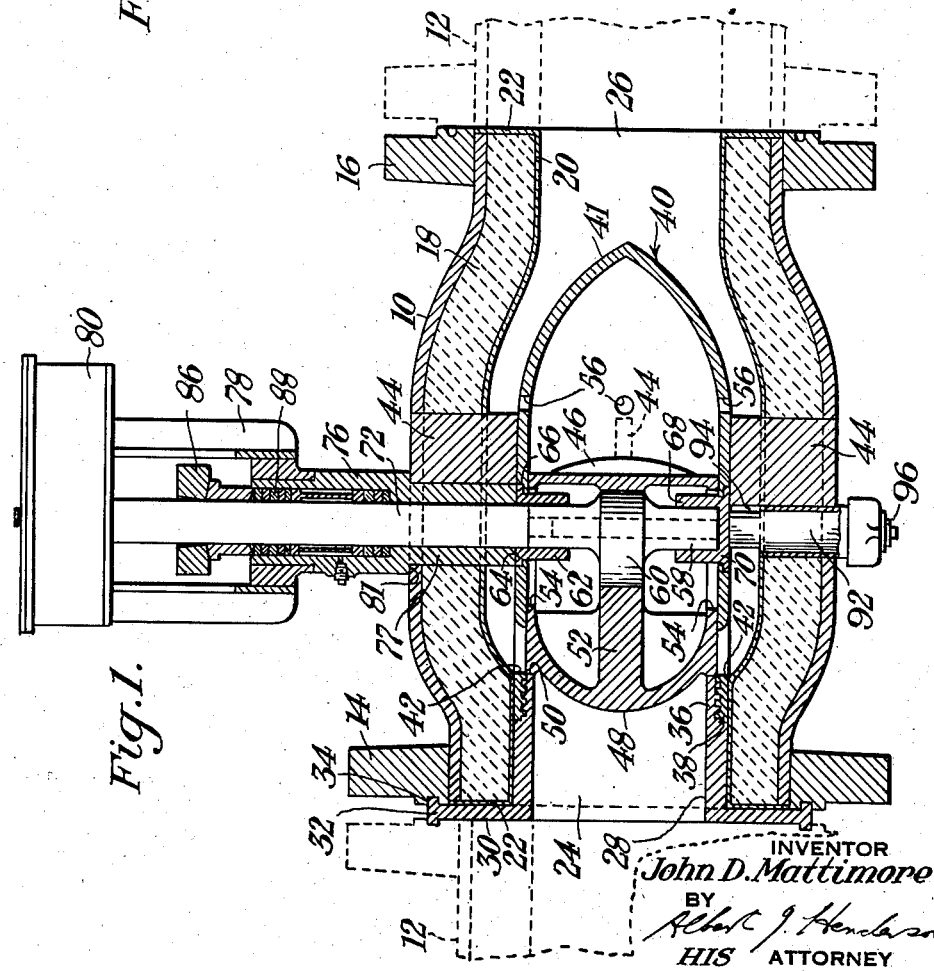

May 8, 1945. J. D. MATTIMORE 2,375,674
VALVE
Original Filed Aug. 13, 1942 2 Sheets-Sheet 1

INVENTOR
John D. Mattimore
BY
Albert J. Henderson
HIS ATTORNEY

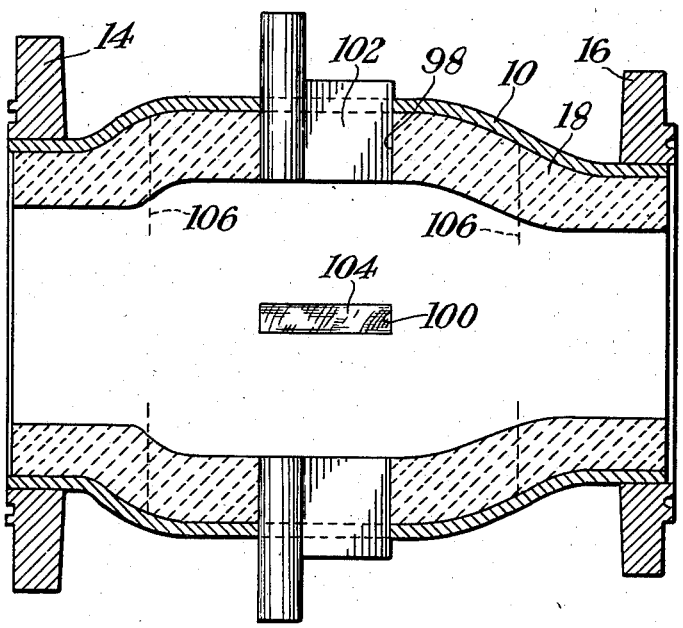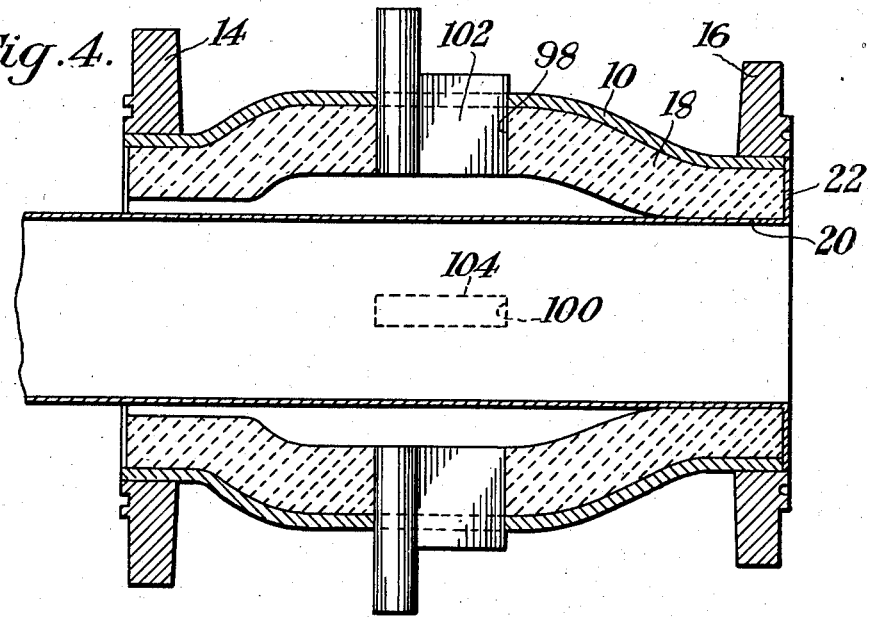

Patented May 8, 1945

2,375,674

UNITED STATES PATENT OFFICE 2,375,674

VALVE

John D. Mattimore, Louisville, Ky., assignor to Walworth Patents Inc., Boston, Mass., a corporation of Massachusetts Original application August 13, 1942, Serial No. 454,632. Divided and this application June 12, 1943, Serial No. 490,605

3 Claims. (Cl. 29—157.1)

This invention relates to valves and more particularly to large capacity valves for controlling fluids under pressure and extremely high temperatures and to the method of making such valves. This application is a division of my copending application Serial No. 454,632, filed August 13, 1942.

One object of the invention is to reduce the weight and the cost of manufacturing the valve while providing adequate strength and minimum heat loss.

Another object of the invention is to secure high resistance to injurious effects of the high temperature fluids on the valve structure.

Another object of the invention is to render parts exposed directly to the high temperature fluids to be replaced when disintegrated or worn without reconstructing or rebuilding of the entire valve structure.

Another object of the invention is to facilitate the manufacture of valves capable of handling large volumes of high temperature fluid.

Other advantages will become apparent from the following description taken in connection with the accompanying drawings wherein:

Fig. I is a front elevation partly in section of the valve structure;

Fig. II is a side elevation partly in section of the valve structure shown in Fig. I;

Fig. III is a longitudinal section through the valve body illustrating a step in the method of manufacture;

Fig. IV is a longitudinal section through the valve body illustrating another step in the method of manufacture, and Fig. V is a section of a detail.

Referring more particularly to the drawings, the valve comprises a tubular shell 10 of wrought steel having both ends reduced to a size commensurate with the outer diameter of a lined pipe line 12 within which the valve is adapted to be installed. The opposite ends of the shell 10 may carry flanges 14 and 16 secured thereto by welding and by means of which the valve may be connected in the pipe line. It will be understood that other conventional methods of connecting the valve in the pipe line may be adopted, including welding the shell 10 directly into the line. The shell 10 is provided with a lining 18 of heat resistant cement which extends completely around the inner surface of the shell except at points where structural parts of the valve mechanism project therethrough as will hereinafter be described. The lining 18 is retained in position in the shell 10 by means of a tubular retaining member 20 provided with flanges 22 at opposite ends thereof which extend along the terminal ends of the lining 18 and are secured by welding to the terminal ends of the shell 10. The retaining member 20 defines a flow passage through the valve having an inlet 24 at one end thereof and an outlet 26 at the other.

The inlet 24 is of larger diameter than the bore of the lined pipe line 12 and is provided with a tubular valve seat member 28 having a bore of substantially the same diameter as the inner diameter of the lined pipe line 12. The valve seat member 28, preferably made of heat resisting alloy steel, fits closely within the inlet 24 and is provided with an annular flange 30 at its outer end which extends beyond the outer periphery of the shell 10 and is provided with an annular tongue 32 extending laterally beyond the surfaces of the flange 30 for engagement with suitable grooves 34 formed in the flange 14 and in the complementary flange carried by the pipe line.

The inner end of the valve seat member 28 is provided with a reduced threaded portion 36 spaced from the retaining member 20 and adapted for engagement with a threaded annular portion 38 formed on one end of a hollow guide member designated generally by the reference numeral 40. The guide member 40, also made of heat resisting alloy steel, is provided with a closed end 41 of streamlined form and is spaced from the retaining member 20 to form an annular flow area in the flow passage beyond the valve seat member 28. A pair of diametrically opposite arcuate slots 42 are formed in the guide member 40 adjacent the annular portion 38 of the guide member, thereby providing oppositely disposed ports affording communication between the inlet 24 and the annular flow area defined by the spaced arrangement of the guide member 40 and the retaining member 20. The streamlined end 41 of the guide member is supported by a plurality of rectangular projections 44 which extend from the exterior of the shell 10 through the lining 18 and retaining member 20 into engagement with the periphery of the guide member 40 adjacent the streamlined end 41. In this instance, four such projections 44 are shown but it will be understood that any desired number may be provided. The projections 44 may be secured to the shell 10 by welding and in addition may be welded to the retaining member 20 to prevent leakage from the flow passage.

A valve member 46 is slidably mounted in the guide member 40 and is provided with a head 48 which cooperates with a seat 50 formed on the inner end of the valve seat member 28 to control flow of fluid through the ports 42. The valve member 46 is hollow and has an internal projection 52 extending axially from the head 48 into the bore thereof. Communication with the interior of the hollow valve member 46 is afforded by the provision of a pair of spaced openings 54 located diametrically opposite each other in the wall of the valve member. In order to prevent entrapment of fluid within the hollow guide member 40 a plurality of openings 56 may be provided in the streamlined end 41 to afford communication between the interior of the guide member 40 and the flow passage.

The operating means for reciprocating the valve member 46 into and out of engagement with its seat 50 may comprise, in this instance, a valve stem constructed of sectional form for a purpose to be described hereinafter. One portion 58 of the valve stem is carried wholly within the guide member 40 and carries a cam element 60 intermediate its ends for engagement with the projection 52 on the interior of the valve element 46. The portion 58 is maintained in position at one end by a bushing 62 which extends from the tubular member 40 into the interior of the valve member 46 and is provided with a head 64 which seats within a suitable counter-sunk opening 66 formed in the guide member 40. The opposite end of the portion 58 is supported in a bearing cap 68 which is similar to the bushing 62 but has the head end 70 closed to support the end of the portion 58.

The other or exterior portion 72 of the valve stem projects through the shell 10 and guide member 40 and is connected to the portion 58 by a separable form of coupling. In this instance, a non-circular projection 74 is formed on the end of the exterior portion 72 and engages with a complementary non-circular opening formed in the end of the portion 58. The exterior portion 72 of the valve stem is rotatably mounted in a bonnet 76 having a reduced end 77 projecting through the shell 10 and abutting the head 64 of bushing 62. The bonnet 76 carries a yoke 78 at its outer end which serves to support the valve operating mechanism 80 with which the valve stem 72 operatively engages. The bonnet 76 may be welded to the shell 10 around the shoulder 81 formed at the reduced end 77 and similar sealing means may be used at the junction with the retainer 20. The yoke 78 is provided with projections 82 extending from opposite sides thereof and carrying bolts 84 engaging with a suitable packing gland 86. The packing gland is adapted to compress packing 88 around the stem 72 when pressure is applied to the gland by means of the nuts 90.

The bearing cap 70 is supported in position in the guide member 40 by a hollow plug 92 which extends through the shell 10 into abutting engagement with the bearing cap. The inner end of the plug 92 may be slotted as at 94 to provide entrance for fluid from the flow passage into the plug which may drain from the plug by removal of the screw 96 attached thereto.

Referring more particularly to Figs. III to V inclusive, the valve body may conveniently be formed by the method now to be described. The shell 10 having the flanges 14 and 16 secured thereto is first provided with diametrically opposite openings 98 of key-hole form located in the central portion thereof. A second pair of openings 100 of rectangular form are also formed in the shell 10 perpendicular to the key-hole shaped openings 98. Wooden plugs 102 of the form shown in Fig. V are utilized to close the openings 98 while wooden plugs 104 of rectangular form are utilized to close the openings 100. The plugs 102 and 104 are driven into the shell 10 to a depth equal to the thickness of the lining 18 and sufficient insulating material in the form of high temperature cement to cover the central portion of the shell 10 up the points designated in broken lines 106 is then installed. A commercially available insulating material is shaped in the form of segments which can be readily pushed into place around the wooden plugs 100 and 102 and trimmed with a hack-saw where required. The joints around the wooden plugs may be completed by inserting the necessary quantity of high temperature cement.

When the central portion of the shell 10 has been lined, the opposite ends beyond the broken lines 106 in Fig. III may be lined by molding a sufficient quantity of high temperature cement to the shape and thickness required. Preferably the flanges 14 and 16 project slightly beyond the terminal ends of the shell 10 and its lining to accommodate the flanged ends of the retaining member 20 which is now installed. The retaining member 20 may be formed of a tube of light sheet metal, preferably of heat resisting alloy steel, and may have one end provided with a flange 22 of a diameter equal to the inside diameter of the flange 16 to which it is secured by welding. The retaining member 20 is then rolled out to conform with the inside contour of the lining 18 and the opposite end is flanged and welded to the end flange 14. The wooden plugs 101 and 104 may then be withdrawn and slots conforming to the shape of the openings 98 and 100 may be formed in the retaining member 20. The shell 10 is now ready for insertion of the bonnet 76 and its related projection 44 in one of the openings 102 and for the insertion of the drain plug 92 and its related projection 44 on the opposite side. The rectangular openings 100 may then receive the other pair of rectangular projections 44 and all of these parts may be sealed on the interior by welding to the retaining member 20 when in position. If required, additional high temperature cement may then be forced between the bonnet 76, projection 44 and the shell 10 as well as around plug 92 and the other portions which project through the shell 10. The final operation is to weld the bonnet 76, plug 92 and the projections 44 to the shell 10 on the exterior.

The assembly of the parts of the valve structure is facilitated by the provision of the sectional form of valve stem. The guide member 40 containing the valve member 46 may be inserted in the body from the inlet end and the valve seat member 28 threadedly engaged therewith. The exterior portion 72 of the valve stem is then inserted through the bonnet into engagement with the valve stem portion 58 and the super-structure, comprising the valve operating mechanism 80, and the packing arrangement, can be placed in position. Dismantling of the valve is equally simple and merely requires that the upper section 72 of the valve stem be withdrawn sufficiently far to permit the disengagement of the projection 74 from the valve stem section 58 whereupon the shell 40 and its associated parts can be withdrawn with the valve seat member 28 from the inlet end 24.

When the valve is connected in a pipe line, the rotation of the valve stem 72 by the rotating mechanism 80 will serve to operate the valve stem portion 58 through the medium of the non-circular projection 74 causing the cam element 60 to actuate the valve member 46 toward and away from its seat within the flow passage. The passage of fluid from the pipe line at the inlet end to that at the outlet end is obstructed to a minimum extent by the valve member and its operating means within the valve body. A streamlined flow without undue turbulence or eddy currents results and the velocity of the fluid is lessened and the pressure drop reduced. Moreover, temperatures in the neighborhood of 1400 degrees Fahrenheit have little or no deleterious effects upon the value structure due to the provision of the lining and the use of heat resistant alloy steel for the operative parts of the valve. As the tubular shell 10 may be several feet in diameter for handling large volumes of fluid, it could not be constructed of steel capable of withstanding such elevated temperatures without considerable expense. Consequently, in this invention the shell 10 is constructed of ordinary carbon steel and is protected by the lining of heat resistant cement. Moreover, as the lining is of substantial thickness the heat of the fluid passing through the valve is not dissipated and the heat losses are comparatively small.

It will be understood that many changes may be made in the details of construction, arrangement of parts and materials used which are shown and described herein for illustrative purposes and the invention is not to be limited to the form disclosed but is to be accorded the full scope of the appended claims.

I claim:

1. The method of making valves comprising lining a tubular member with insulating material, inserting a tubular retaining member adjacent the inner surface of said lining, flanging the end of said retaining member around said lining, securing said end to said tubular member, and rolling said retaining member into close engagement with said lining.

2. The method of making valves comprising cutting perforations at diametrically opposite points through a tubular member, sealing said perforations with plugs, lining said tubular member with insulating material, inserting a tubular retaining member adjacent the inner surface of said lining, flanging the end of said retaining member around said lining, securing said end to said tubular member, rolling said retaining member into close engagement with said lining, and withdrawing said plugs.

3. The method of making valves comprising cutting perforations at diametrically opposite points through a tubular member, sealing said perforations with plugs, lining said tubular member with insulating material, inserting a tubular retaining member adjacent the inner surface of said lining, flanging the end of said retaining member around said lining, securing said end to said tubular member, rolling said retaining member into close engagement with said lining, and perforating said retaining member to coincide with the perforations in said tubular member and lining.

JOHN D. MATTIMORE.